(12) United States Patent
Shann

(10) Patent No.: US 6,859,932 B1
(45) Date of Patent: Feb. 22, 2005

(54) RELOCATION FORMAT FOR LINKING

(75) Inventor: Richard Shann, Mathern (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 691 days.

(21) Appl. No.: 09/650,033

(22) Filed: Aug. 28, 2000

(30) Foreign Application Priority Data

Sep. 3, 1999 (GB) ............................................. 9920911

(51) Int. Cl.$^7$ ............................................. G06F 9/00
(52) U.S. Cl. ........................ 719/331; 719/332; 717/162
(58) Field of Search ................................ 719/331, 332

(56) References Cited

U.S. PATENT DOCUMENTS 6,154,878 A * 11/2000 Saboff ........................ 717/173
6,182,283 B1 * 1/2001 Thomson .................... 717/153

FOREIGN PATENT DOCUMENTS

WO    WO 94 22078    9/1994

OTHER PUBLICATIONS

Apple Computer, Mac OS Runtime Architectures, 1996–97, Apple Computer, Inc., pp. 1–44.*
Standard Search Report carried out in the European Patent Office on the claims filed with the British priority application.

IEEE standard for Microprocessor Universal Format for Object Modules (IEEE STD 695–1990) Online?, Feb. 1990, IEEE, Inc. New York, NY XP002131556.

MacOS Runtime Architectures, Online? 1997, Apple Computer, Inc., Cupertino, CA XP002131555.

TIS Portable Formats Specification, V1.1 (Intel Order No. 241597), Online?, Oct. 1993, Intel Corporation, Mt. Prospect, IL, XP002131557.

* cited by examiner

Primary Examiner—Meng-Al T. An
Assistant Examiner—The Thanh Ho
(74) Attorney, Agent, or Firm—Lisa K. Jorgenson; William R. McClellan; Wolf, Greenfield & Sacks, P.C.

(57) ABSTRACT

An executable program is prepared from a plurality of object code modules, each object code module including section data and associated relocations and at least one of the object code modules further including code sequences at least some of which are like to be repeatedly included in the executable program. Wherever a code sequence is to be inserted, a relocation instruction specifies the location of the code sequence and the code sequence is inserted into the section data at the appropriate point. A linker, a method for assembling, and a computer program product support these operations.

9 Claims, 6 Drawing Sheets

RELOCATION FORMAT FOR LINKING

FIELD OF THE INVENTION

The present invention relates to a relocation format for linking, and in particular to a method of linking, a linker and a computer program product containing the relocations.

BACKGROUND OF THE INVENTION

Linkers for producing executable programs are known. Generally speaking, a linker acts to link a number of object code modules to form a single executable program. Object code modules are usually generated from program source code modules, these modules being written in a high level language. An assembler/compiler reads each source code module and assembles and/or compiles the high level language of the source code module to produce an object code module. The assembler also generates a number of relocations which are used to combine the object code modules at link time in a linker.

The ELF (executable linking format) standard defines a convention for naming relocations belonging to a given section, e.g. rela.abc is relocation section of section .abc. Standard relocations under the ELF format allow an offset in section data to be defined where patching is to occur and a symbol whose value is to be patched. A type field also exists which is used to describe the appropriate method of encoding the value of the symbol into the instruction or data of the section data being patched. According to the existing arrangements, the relocation type definitions are usually created on an ad hoc basis for each instruction set targeted. The 32 bit ELF standard, allows only 256 distinct relocation types, so the same types are reascribed to different semantics for each instruction set.

The existing linkers each have to be set up to understand the particular semantics used for the type definitions in the relocations for each instruction set. Moreover, the relocation operations which can be defined by the relocations are limited in the existing ELF standard.

It is an object of the invention to allow for a linker to have more optimisation possibilities determinable at link time, without significantly increasing the size of object files.

SUMMARY OF THE INVENTION

According to one aspect of the present invention there is provided a method of preparing an executable program from a plurality of object code modules, each module containing sets of section data and associated relocations, and at least one of said modules further including a macro section containing code sequences at least some of which are likely to be repeatedly included in the executable program and macro relocations associated with said macro section, wherein at least one of said sets of section data includes at least one insertion location where said code sequences are to be inserted and its associated relocation instructions include a macro call relocation (R_CALL_MACRO) identifying a location in the macro section, the method comprising at link time when said executable program is prepared: reading said sets of section data and relocation instructions; on locating said macro call relocation identifying the location in the macro section; and inserting said at least some code sequences from said location in the macro section into the set of section data at the insertion location, said at least some code sequences being selected by reading the macro relocations.

The macro relocations can contain conditions resolvable at link time to determine which of the code sequences in the macro section is to be included in the executable program.

The macro call relocation can specify a symbol or parameter which identifies an offset in the object code module where the macro section is located. The macro relocations may also include a start relocation with an offset identifying the beginning of the macro section and an exit relocation with an offset identifying the end of the macro section.

The relocations can include a relocation which supplies a parameter together with an index for holding the parameter in association with the index in a parameter array from which the parameter can be recalled at link time. A further relocation can supply an index for recalling the parameter from the parameter array. These relocations can be used to provide parameterised code sequence within the macro section.

The invention also provides in a further aspect a linker for preparing an executable program for a plurality of object code modules, each module containing sets of section data and relocations, at least one of said modules further including a macro section containing code sequences at least some of which are likely to be repeatedly included in the executable program and macro relocations associated with said macro section, wherein at least one of said sets of section data includes at least one insertion location where said code sequences are to be inserted, and its associated relocations include a macro call relocation identifying a location in the macro section, the linker comprising: a relocation module for reading the relocations, the relocation module being operable to identify a macro call relocation and to locate said location in the macro section; a section data module for holding section data to which the relocations relate and arranged to receive said at least some code sequences from the location in the macro section to be inserted at the insertion location; and a program preparing means which prepares said executable program including said set of section data with the inserted code sequences.

The linker can contain a parameter array for holding a set of parameters used to define the location of the macro section each associated with a respective index. The linker can additionally or alternatively comprise a symbol table which holds values in association with symbols, said symbols being conveyed by the relocations and said values being used to select said at least some code sequences. Alternatively or additionally a condition array can be included in the linker, the condition array holding respective values with associated indexes, said indexes being conveyed by the relocation instructions for recalling said values, said values being used to conditionally select said at least some code sequences at link time.

The invention provides in a further aspect a method of assembling an object code module for linking to form an executable program, the method comprising: executing a set of assembler directives including a macro call directive, and responsive to the macro call directive: naming a location in a macro section in the object code module containing a plurality of code sequences, at least some of which are likely to be repeatedly included in the executable program; marking at an insertion location in a set of section data in the object code module where at least some of said code sequences are to be inserted in the final executable program; generating in association with the section data a macro call relocation identifying the named location in the macro section; and generating a set of relocations for selecting said at least some code sequences for insertion at the insertion location.

The invention provides in a further aspect a computer program product in the form of an object code module which contains sets of section data and relocations, the module further including a macro section containing code sequences at least some of which are likely to be repeatedly included in the executable program and a set of macro relocations associated with said macro section wherein at least one of said sets of section data includes an insertion location where said code sequences are to be inserted, and its associated relocations include a macro call relocation identifying a location in the macro section, the computer program product being cooperable with a linker to cause execution of relocation operations by the linker in dependence on said relocations and including identifying the location in the macro section and inserting said at least some code sequences from that location in the macro section in the set of section data at the insertion location.

In accordance with the described embodiment of the invention in the following, any object module may contain a macro section, generated in the normal way by the assembler. In addition, the toolchain can supply certain standard macros in the object modules contained in standard libraries. In addition, user written code can include a macro section. The linker does not distinguish between these, it simply merges them altogether in the same way as it merges other section data. Thus, the linker processes an object code module having a set of ordinary sections (e.g. data, .text etc) with associated relocation sections (.relo.data, .relo.text) and a single macro section with its associated .relo.macro section containing macro relocations.

The object module also has a symbol section which contains symbols which identify offsets in the other sections (e.g. .text, .data, .macro). Some symbols identify offsets which identify locations inside the macro section, and these symbols can be used as the targets of a macro call relocation. Relocations in the macro relocation section determine which bytes of section data in the macro section, if any, are substituted from the macro section starting from the labelled offset.

Thus, in assembling a number of source code modules according to the ELF standard, the output ELF object contain an ELF header and the sections identified above. The final executable program generated by the linker reading the ELF object will include a number of code sequences from the "normal" sections and a number of code sequences taken from the macro section. In one embodiment, the code sequences taken from the macro section are determinable by conditions resolvable at link time.

For a better understanding of the present invention and to show how the same may be carried into effect, reference will now be made by way of example to the accompanying drawings.

DESCRIPTION OF THE PREFERRED EMBODIMENT

Figure 1:
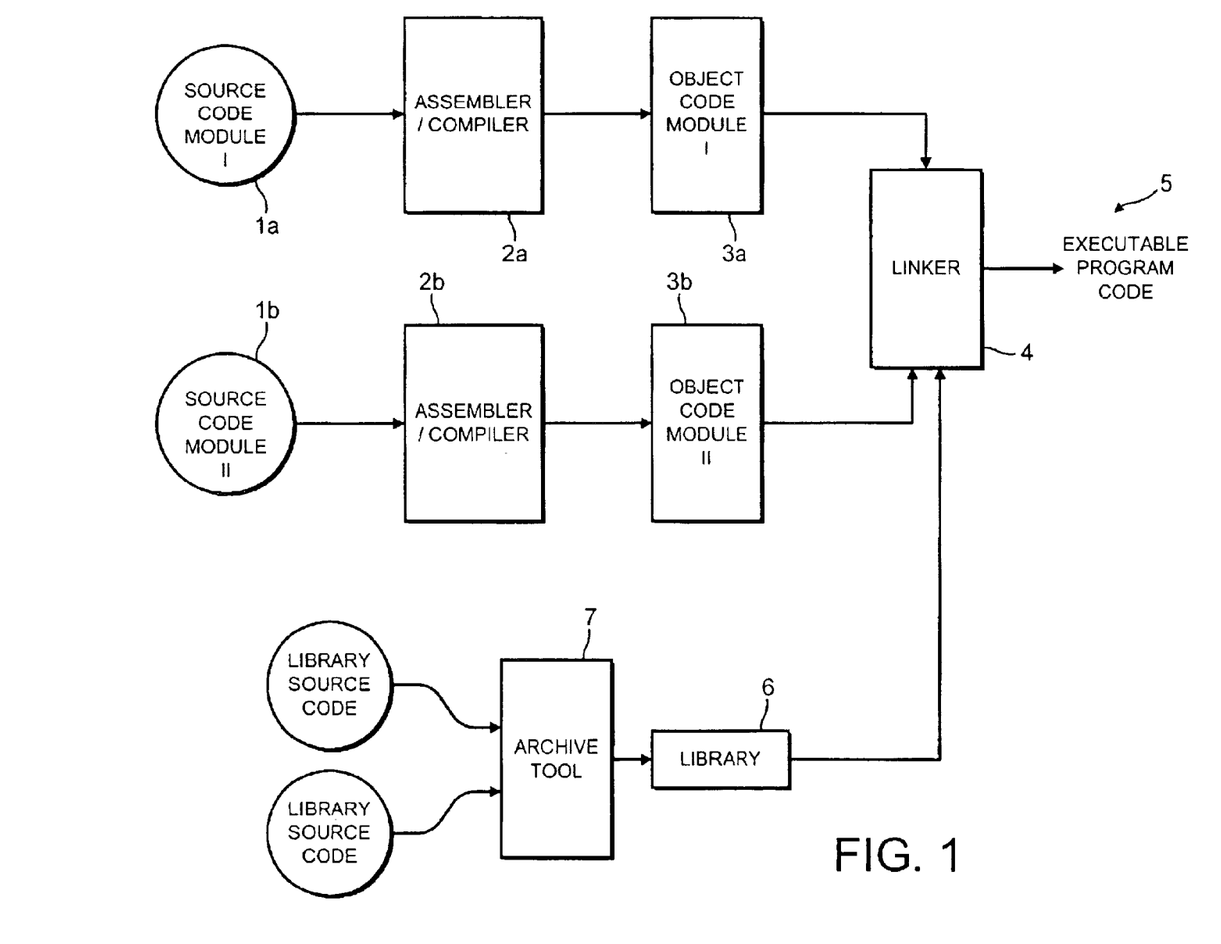
FIG. 1 is a block diagram illustrating the context of the invention.

With reference to FIG. 1, a system for linking a number of program modules to form a single executable program is shown schematically. A number of program source code modules 1a,1b, each module written in a high level language is provided. The particular high level language used for each source code module may vary from module to module, or alternatively all of the program source code modules may be written in the same high level language. Each source code module 1a,1b, is input to a respective assembler/compiler 2a,2b which assembles and/or compiles the high level language of the source code module to produce an object code module 3a,3b. Each object code module 3a,3b is the low level language equivalent to each respective source code module 2a,1b, the low level language being a language which is directly readable by a target computer into which the final resulting single executable program is to be loaded. It will be appreciated that a single assembler/compiler could be used to sequentially convert a number of source code modules to respective object code modules.

Each object code module 3a,3b is passed to a linker 4. Object code modules may be stored in libraries, such as the library 6 in FIG. 1, placed under the control of an archive tool 7. Access to these object code modules by the linker 4 is explained later. The linker combines all of the respective object code modules 3a,3b to produced single executable programs, still in the low level language suitable for the target processor into which the program is to be loaded.

For a given architecture there are often different instruction sequences for achieving the same objective depending on the values of the operands which are being handled. For example, "load a function address into a register" may be achieved in various ways depending on the address in question. When the operand is unknown before link time there is scope for re-writing the code at link time depending on the value of the operand. This re-writing of the code is a form of optimization termed herein "linker relaxation".

In the following embodiments a scheme is described for achieving linker relaxation based on information written in assembler files and passed to the linker as special relocations. The special relocations are also used for rewriting particular instruction sequences as one of a set of known alternatives.

Each assembler generates an object code module including sets of section data, each set of section data having a set of relocations generated by the assembler to describe how the section data is to be patched so as to render it compatible with other section data to form the program 5. These relocations are generated by the assembler. Section data comprises a plurality of code sequences executable in the final program, and data values to be accessed by the executing program.

In particular a set of "relocations" to enable link time optimization of code is described. Conventionally a relocation describes the patching of section data or instructions with (encoded versions of) symbols. Such relocations are referred to herein as "bit relocations". In addition a number of so-called "special relocations" are discussed herein which are sometimes referred to in the following as "non-bit" relocations to distinguish from conventional "bit" locations.

Firstly, non-bit relocations are defined that describe the calculation of integer values based on the values of symbols and constants passed to the linker. The integer values in the described embodiment are 32 bits long.

Secondly, relocations are also provided to conditionally include or delete section data, written into the section at the point(s) of possible inclusion, based on those calculations.

Thirdly, a "macro-call" relocation is defined that allows section data (code sequences) to be inserted from a special section (".macro" section) written to contain frequently used idioms. Section data that is to be selectively inserted into a section being optimized by the linker can be thought of as a "link time macro". It is parameterized by symbols with the substitution of the values for the parameters being performed by the linker.

One use of the special relocations discussed herein is to introduce an arbitrary set of instruction sequence alternatives into a set of section data. The alternative instruction sequences are written as alternative sequences in are a special macro section in the object code modules and a macro call is inserted at the point in the ordinary section wherein one or more of them may be needed. As mentioned above, the object code modules can be user defined or retrieved by the linker 4 from a library 6 as object files containing template code for insertion in the executable program wherever it is needed.

It is assumed that a skilled reader is familiar with the ELF format and so only a very brief description will be given here prior to describing the special relocations.

The ELF (executable and linking format) standard defines a convention for naming relocation sections belonging to a given section. For a section of name .xxx the standard prescribes relocation sections .rel.xxx and .rela.xxx. The structure of these sections is defined and a partial semantic associated with them. Specifically an entry in .rel.xxx has, an offset field-the offset in the .xxx section where the patching is to occur, a symbol field-the symbol whose value is to be patched, and a type field-an otherwise undefined type.

It is the type field that is used to describe the appropriate method of encoding the symbol value into the instruction or data of the .xxx section.

The .rela.xxx section is similarly defined but has an extra field (the addend) with the semantic that the addend is to be added to the symbol value before patching in.

In order to support the special relocations described herein, a new type of relocation section is defined, with the naming convention .relo.xxx which is specifically intended to support optimizing at link time. In this way the .rel and .rela sections are left free to be used for conventional bit relocations.

Figure 2:
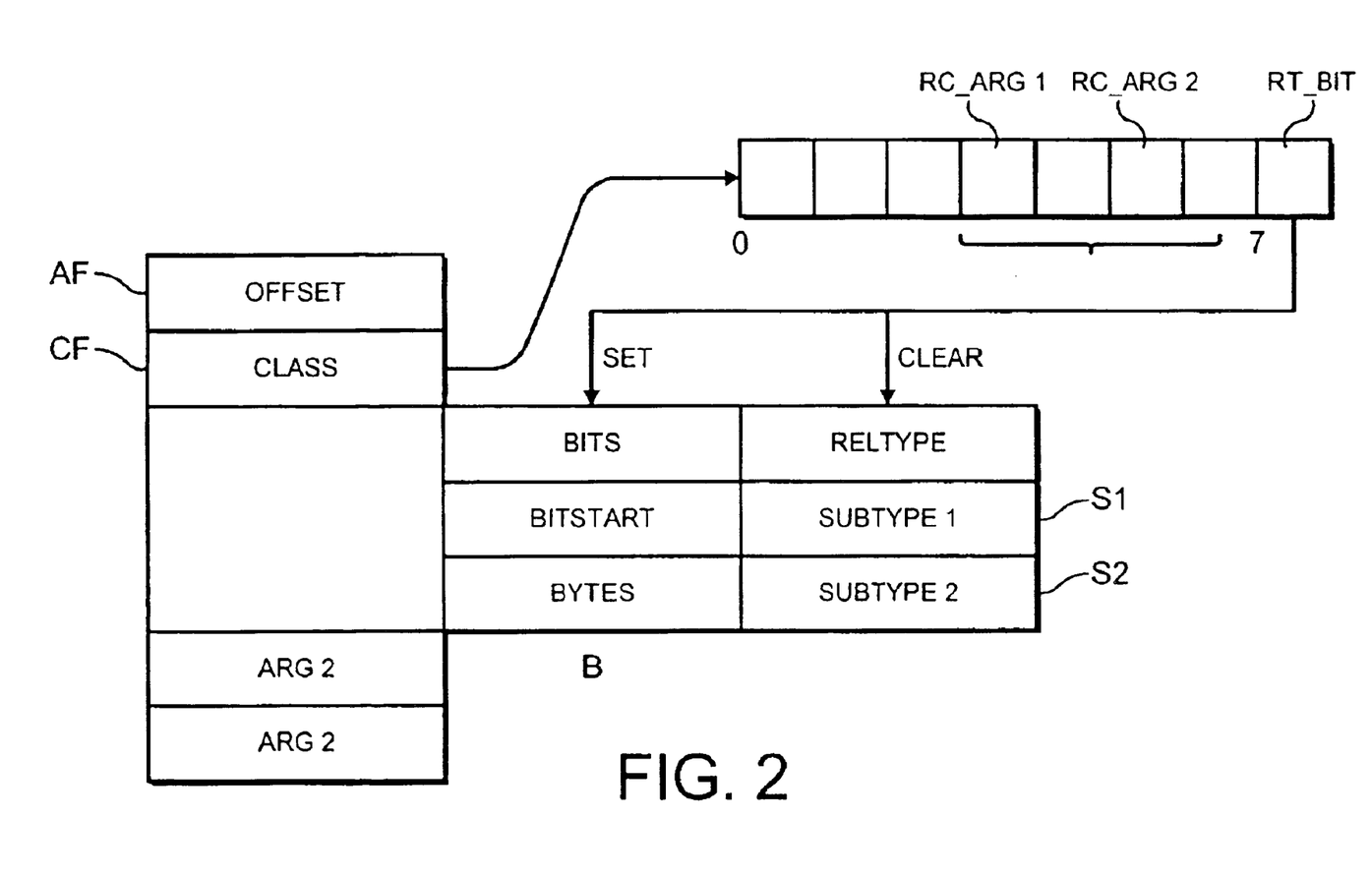
FIG. 2 is a sketch illustrating the layout of the special relocations.

The format of an entry in the .relo section is given in Annexe 1 (it should be read in the context of the 32-bit ELF standard). It is illustrated in FIG. 2.

The underlying structure of the new type has an address field AF (r_offset), a 1 byte classification field CF (r_class), 3 information fields which are labelled reltype, S1,S2 (1 byte each) for non-bit NB relocations and bit, bitstart, bytes for bit (B) relocations, and two one word arguments (r_arg1; r_arg2).

r_offset

The location at which to apply the relocation action. (That is, if this is the .relo.xxx section, then r_offset is the offset in the .xxx section where the relocation applies.)

r_class

The classification byte indicates the type of relocation (bit or non-bit), and also conveys information about the use of the remaining fields.

In the classification byte, bit 7 RT_BIT indicates a bit relocation if set (in which case the B fields apply) or non-bit relocation if clear (in which case the NB fields apply) Bits 3–6 specify whether the r_arg1,2 fields are a symbol index or a value. Table 1 defines how the bits specify the interpretation of the r_arg1,2 fields.

r_arg1,2

The interpretation of these fields depend on bits 3–6 of the r_class field. Two bits RC_ARG1, RC_ARG2 are associated with each of r_arg1 and r_arg2. For bit relocations these two fields are normally used as symbol and addend.

For non-bit relocations the fields r_arg1,2 hold constant data being passed with a non-bit relocation. As with bit relocations bits 6 and 5 say whether they hold a symbol index or a value. The actual use of any symbol or value passed with a non-bit relocation depends on the nonbit.reltype field. This may be an absolute value representing things such as alignment, register numbers etc. The semantics are given in the table of relocation types in Annexe 2.

The bit (B) type fields:

r.bit.bits

The number of bits that are to be patched. A lower case "b" is used to indicate this quantity in the name of a relocation.

r.bit.bitstart

The least significant bit to be patched. A lower case "s" is used to indicate this quantity in the name of a relocation.

r.bit.bytes

The size of the object being patched. This is needed for big endian targets in order to find which byte the least significant bit is to be found in, and where the higher order bits are. An upper case "B" is used to indicate this quantity in the name of a relocation.

Note that the following notation is used to name the bit relocations:

R_b<val>s<val>B<val> where <val>'s represent the number of bits, start bit and number of bytes as specified by the r-bits, r.bitstart, r.bytes fields. For example R b16s0B4 will patch the least significant two bytes of a four byte object. This will be the bytes at offsets 0,1 or 4,3 depending on the target endianness.

The non-bit (NB) type fields:

r.nonbit.reltype

This field describes what sort of action the linker must perform. These include such things as executing an operation on the linker's internal stack of values, storing parameters to macros, conditionally deleting section data etc, as described in more detail later.

r.nonbit.subtype1,2 (S1,S2)

These fields hold values whose interpretation depends on the reltype field, and bits 3 to 6 of the classification field.

TABLE 1

| Name | RC_ARG1 | Meaning |
| --- | --- | --- |
| RC_PARAM | 3 | r_arg1 is param |
| RC_VAL | 2 | r_arg1 is value |
| RC_SYM | 1 | r_arg1 is symbol |
| RC_UNUSED | 0 | r_arg1 is unused |

Figure 3:
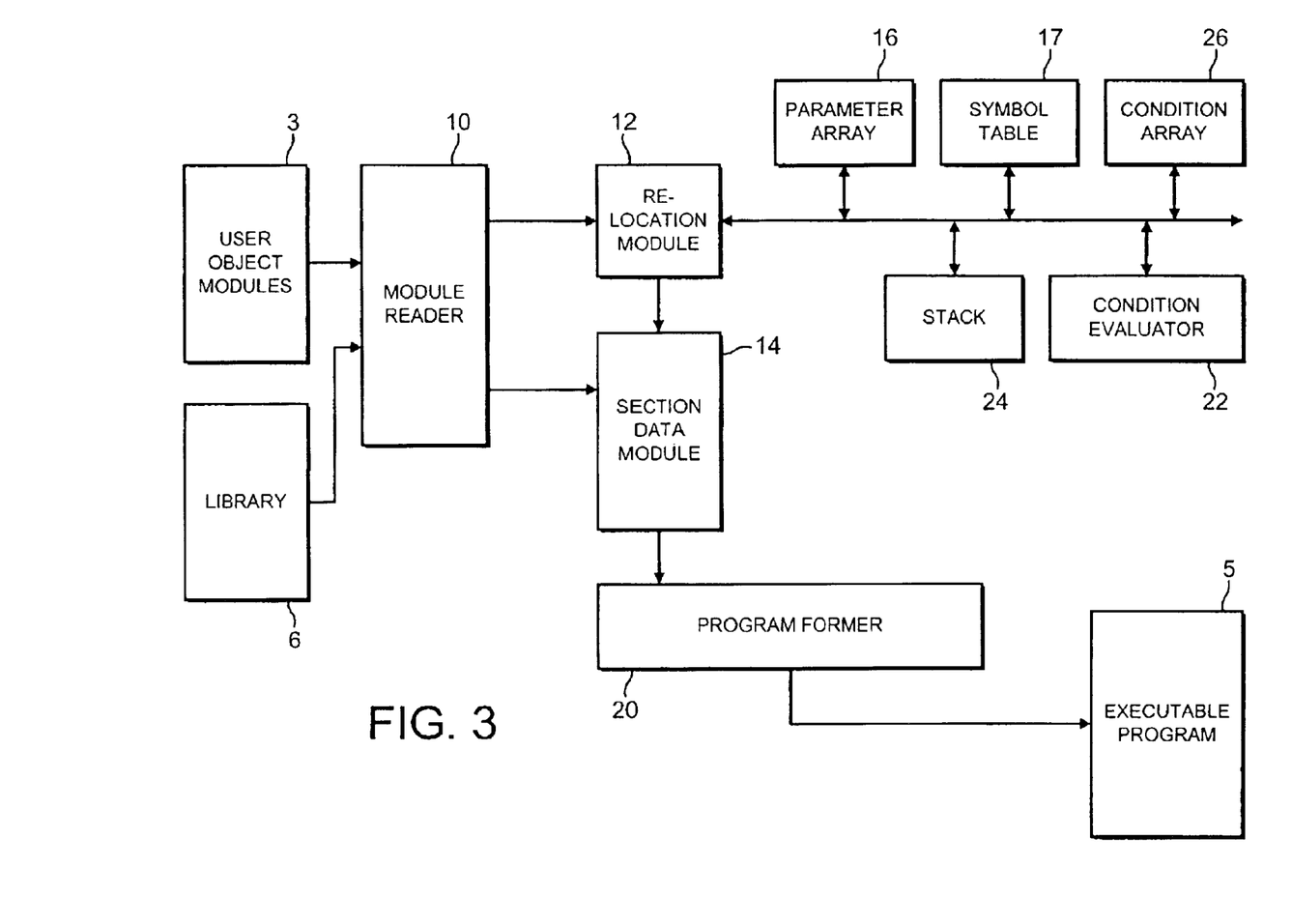
FIG. 3 is a block diagram of a linker.

The above described new type of relocation section supports a number of special relocations which allow a number of different functions to be performed by the linker. FIG. 3 is a block diagram of components of the linker which will be used to describe these additional functions. It will be appreciated that in practice the linker can be constituted by a suitably programmed microprocessor. It will be understood therefore that the schematic blocks shown in FIG. 3 are for the purposes of explaining the functionality of the linker.

The linker comprises a module reader 10 which reads a set of incoming object files as user written code modules and library object files from the library 6. A relocation module 12 reads the relocations in the object code module. A section data module 14 holds section data from the object code module and allows patching to take place in response to relocation instructions in the object code module interpreted by the relocation module 12. The relocation module can also interpret special relocations and apply these to the section data held in the section data module 14. A program former 20 receives sequences from the section data module 14 and/or the library 18 depending on the actions taken by the relocation module 12 and forms the executable program 5 which is output from the linker 4. The linker also includes a condition evaluator 22 which operates in conjunction with a stack-type store 24. The condition evaluator reads the value of the top entry of the stack 24.

The linker also implements three arrays or tables as follows, a parameter array 16, a symbol table 17 and a condition array 26.

Before describing more specifically each of the above new relocations, the basic operation of forming an executable by a linker is summarised below. The basic operation comprises:

1. copying sections from input modules to same-name sections in the output executable, and
2. patching sections following the relocations in their corresponding relocation sections. This includes deleting code sequences from the module (caused by an assembler directive LT__IF, discussed later) and inserting code sequences (caused by a macro call, also discussed later).

After step 1, all the branches of the LT__IF . . . LT__ENDIF assembler directives are present in the executable, and the linker is only concerned with deleting unwanted sequences. In the case of link time macro calls, at step 2, it inserts section data from the macro section (discussed later), deleting the requisite marker bytes. The macro section will itself be subject to the same step 2, each time a macro insertion is required.

Link Time Calculations

The first special relocation type which will be described allows arbitrary calculations to be passed to the linker by way of a number of special relocations which are defined by the reltype field of the new relocation format ELF32__relo. These relocations are numbered 6–29 in Annexe 2.

The set of the special relocation types listed in Annexe 2 allow the linker to support a general purpose stack based calculator. These relocations allow the value of symbols and constants to be pushed on the stack 24 and a designated manipulation to be performed. With the bits RC__ARG1 in the class field CF set to RC__UNUSED (see Table 1), binary operators act on the top two stack entries. Otherwise, the value passed and the top of stack (tos) entry are used. Unary operators operate on the top of the stack 24 (tos). Both pop their operands and place the result on the top of the stack. The full definition of the relocation types to support this is given in Annexe 2. There follows examples of their use.

Patch symbol plus addend in 16 bit target integer

Figure 4:
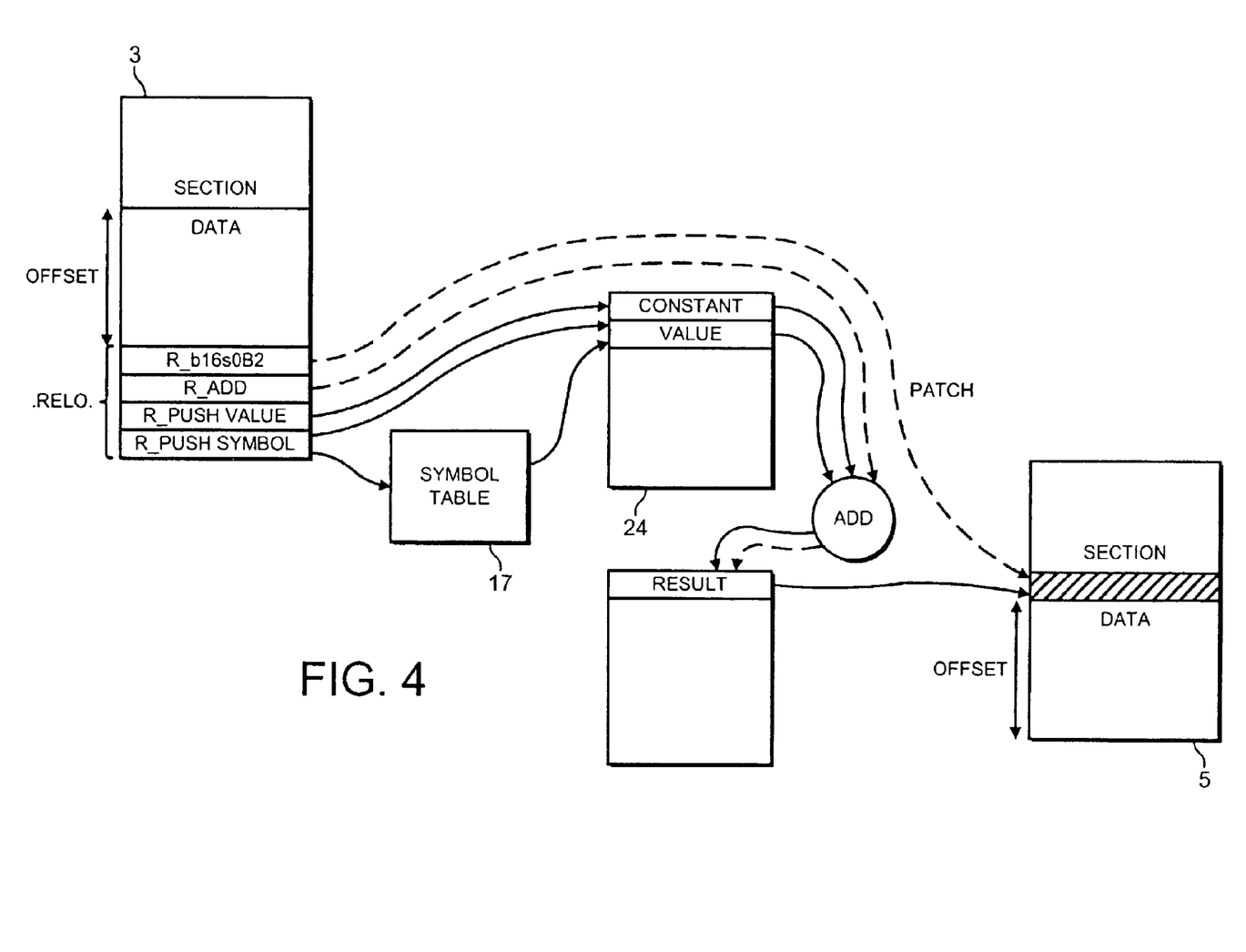
FIG. 4 is a schematic diagram illustrating one example of the use of special relocations to implement calculations.

This could be accomplished by the following ordered sequence of relocations. The effect of the sequence is illustrated schematically in FIG. 4. FIG. 4 illustrates section data and its accompanying set of relocations forming part of an object code module 3. The relocations will be read in order from the bottom in FIG. 3. The listed relocations are:

R__PUSH symbol /* relocation to push value of symbol on stack */R

R__PUSH value /* relocation to push constant value on stack */

R__ADD /* pop top two values off stack add them and push result back */

R__b16s0B2/patch the value popped from the top of stack into the section data, 16 bits are to be patched, starting at bit 0, in target object two byte wide */ all with the same offset (the offset of the integer to be patched in the section). The result of the patch is shown in the section data which forms part of the executable program S.

The above relocations are implemented as described in the following with reference to FIGS. 3 and 4. The section data and relocations are read by the module reader 10. The section data is applied to the section data module 14 and the relocations are applied to the relocation module 12. The relocation module considers the first relocation, in this case R__PUSH symbol and acts accordingly to read the required value of the identified symbol from the symbol table 17 and push it onto the stack 24. The subsequent relocations are read, and the necessary action taken with respect to the stack as defined above. Finally, the last bit relocation R__b16s0B2 patches the final result value from the stack 24 into the 16 bit target integer. This patched section data is held in a section data module 14 ready for inclusion in the final program at the program former 20 unless, of course, some later relocations make further modifications prior to completion of linking.

As a short-hand any operator can be accompanied by a symbol as one of its operands (the left hand operand in the case of binary operators). In that case the following sequence could be used:

R__PUSH value /* relocation to push value on stack */

R__ADD symbol /* pop top add the value of the symbol and push back the result */

R__b16s0B4 /* patch section data, 16 bits, starting at bit 0, in target object four bytes wide */

Although the above are given as examples of use of the stack calculator in the linker, the stack calculator is not actually needed for this calculation since both a symbol and a value could be passed in one normal bit relocation. All that is needed in this case is:

R__b16s0B2 symbol value.

Nevertheless the example illustrates how the special relocations support a stack based calculator at the linker.

The top of stack can also be used for conditional linker relocations as described later. For example, to include section bytes if a symbol has more than 8 bits we could use:

R__PUSH symbol

R__PUSH 0xffff__ff00

R__AND (the above relocations all have the address field r__offset set equal to the start of the section bytes to be conditionally included)

R__ENDIF (with the address field r__offset set equal to end of section bytes to be included+1)

(R__ENDIF is discussed later)

The relocation R__PUSH can have a number of different effects. With the bits RC__ARG1 set to RC__SYM (i.e. the r__arg1 field acts as a symbol index), the field s1 holds a value to indicate what part of symbol information is to be pushed on the stack. The value held in the $S_1$ field is indicated in

TABLE 2

| Name | Meaning | Value |
|---|---|---|
| SF__NAME | st__name | 1 |
| SF__VALUE | st__value | 2 |
| SF__SIZE | st__size | 3 |
| SF__INFO | st__info | 4 |
| SF__OTHER | st__other | 5 |
| SF__INDEX | st__shndx | 6 |

Different macro parameter types (MPT) can be passed with the R__PUT__PARAM and R__GET__PARAM relocations. They enable type-checking of the macro call parameters, and allow the linker to distinguish symbol indexes from values. MPT__VALUE denotes a constant value and is denoted by value 0 in the s2 field.

MPT__SYMBOL denotes a symbol index and is denoted by value 1 in the s2 field.

For a processor having two instruction modes, this artefact can be used to denote the mode of instruction that the symbol labels. Thus, the R__PUSH__ST__OTHER is used to detect at link time if a symbol is mode A or mode B code.

The assembler sets s1 to mask off the STO_MODE_A bit in the symbol's st_other field. The linker pushes the bitwise AND of s1 and the st_other field on the internal linker stack. This can be used by the linker conditional relocations to insert the appropriate calling sequences.

Conditional Section Data

Another set of the special relocations allow code sequences to be conditionally included in a final executable program. For now, it is assumed that all the possible alternative sequences are included in the section data of the object code module which the linker is currently examining. It will become clear later, however, that other possibilities exist for the alternative sequences.

A method of conditionally including one sequence out of a number of alternatives in the section data will now be described with reference to FIGS. 3 and 5. The assembler 2 acts on Conditional Assembler directives to generate special relocations which instruct the linker to conditionally delete unwanted section data.

Figure 5:
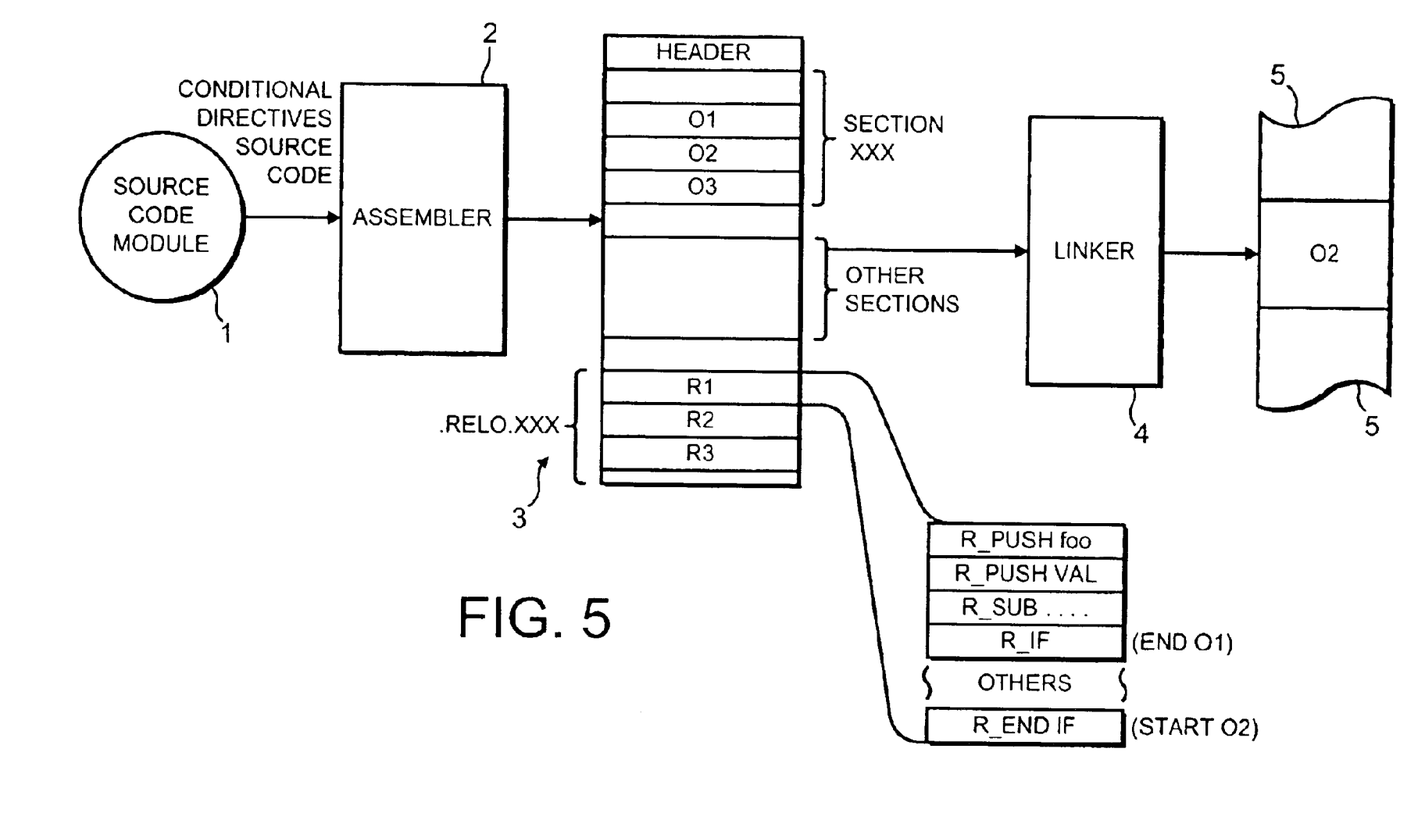
FIG. 5 is a diagram showing the use of special relocations to conditionally insert section data.

FIG. 5 shows how a resulting object module comprises a set of sections, each section comprising a plurality of code sequences O1,O2,o3 each having a relocation section R1,R2,R3 generated by the assembler. The section data .xxx is shown in FIG. 5 with its relocations R1,R2,R3 in the relocation section .relo.xxx.

The relocation bracket between them R_IF and R_END IF relocations to denote the respective offsets defining the code sequences in the section data. An example sequence is illustrated in FIG. 5. The relocation sections are read by the relocation module 12 of the linker 4 to determine how to patch the section data to form a program. According to this embodiment relocation sequences are included in the relocation section associated with each code sequence in the section data to denote that a sequence may be conditionally deleted in the program depending on the top of stack value determined by the previous stack manipulations done by the linker. These relocations compute the conditions to be evaluated, using the symbols or values in the section data.

In FIG. 5, code sequences O1,o2,O3 are alternative sequences for possible deletion in the final module. Thus, the final executable program 5 might include sequence O2 only, sequences O1,O3 having been deleted by the linker because of the relocations R1,R3. In that case, sequence O2 has been "patched" (i.e. not deleted) using relocations in R2.

At link time the relocation module 12 makes multiple passes over the section's relocations recording which conditional passages are included. These are held in the section data module 14 while the condition evaluator 22 evaluates the condition by examining the top of stack. The conditions for inclusion are based on the values of symbols and, since some of these will be forward references to labels in the same section, the result of a given conditional expression may change on the next pass. For this reason multiple passes are required until no more changes are needed.

In order to support the conditional section relocation, a number of new Assembler Directives are required as follows.

At These cause certain special relocations to be issued as described later:

LT_IF expr

Marks the start of a block of section data to be conditionally deleted. The condition is that expr should evaluate non-zero. The assembler issues the stack manipulation relocation 6–29 in Annexe 2 to push expr on the linker stack 24 and an R_IF relocation.

LT_ELSE

Marks the start of block of section data to be conditionally inserted/deleted. The condition is the previous LT_IF at the same level of nesting evaluated as zero. The assembler issues an R_ELSE relocation.

LT_CONDITION condition_name expr

The assembler issues the relocations to calculate the expr (that is, expr is on top of the stack). If condition_name has already appeared in an LT_CONDITION directive then the index associated with it is re-used. Otherwise the next unused index is chosen (initially 0). The assembler then issues R_STORE with that index. In this way, the condition array 26 can be constructed. After the condition_name has been associated with an index in this way it can be used in an expression in place of a constant or symbol. When used, the assembler issues R_FETCH with the index associated with condition_name. That index is used to address the condition array 26. The scope of condition_name is the section where the LT_CONDITION directive occurs, from its point of first occurrence.

LT_ENDIF

Marks where normal linker processing re-starts after an LT_IF/LT_ELSE/LT_IF_FIXED (described later) directive. The assembler issues an R_ENDIF relocation.

The following are the special relocations used to support conditional section data deletions, which are issued by the assembler responsive to the conditional Assembler Directives.

R_IF

Causes the top entry to be popped from the linker's stack of values. If the value is zero then section data is skipped and the succeeding relocations are ignored until R_ELSE/R_ENDIF is encountered. If the value is non-zero then relocations are processed and instructions are not deleted until R_ELSE/R_ENDIF is encountered.

R_ENDIF

Defines the end of the relocations subject to the R_IF relocation, and of section data to be conditionally deleted subject to the R_IF relocation.

R_ELSE

If this is encountered while section data is being taken then section data is skipped and the succeeding relocations are ignored until R_ENDIF is encountered. If encountered while skipping due to R_IF then relocations are processed and instructions are no longer deleted until R_ENDIF is encountered.

R_STORE index

A value is popped from the linker's stack of values. It is put in the condition array 26 kept by the linker for this purpose. The value is stored at the index passed with the relocation (in the nonbit.subtype field) . This relocation avoids the overhead of passing the same calculation to the linker many time over.

R_FETCH index

A value is pushed on the linker's stack of values. The value pushed is the value in the condition array 26 at the index passed with the relocation.

Link Time (LT) Macros

Figure 6:
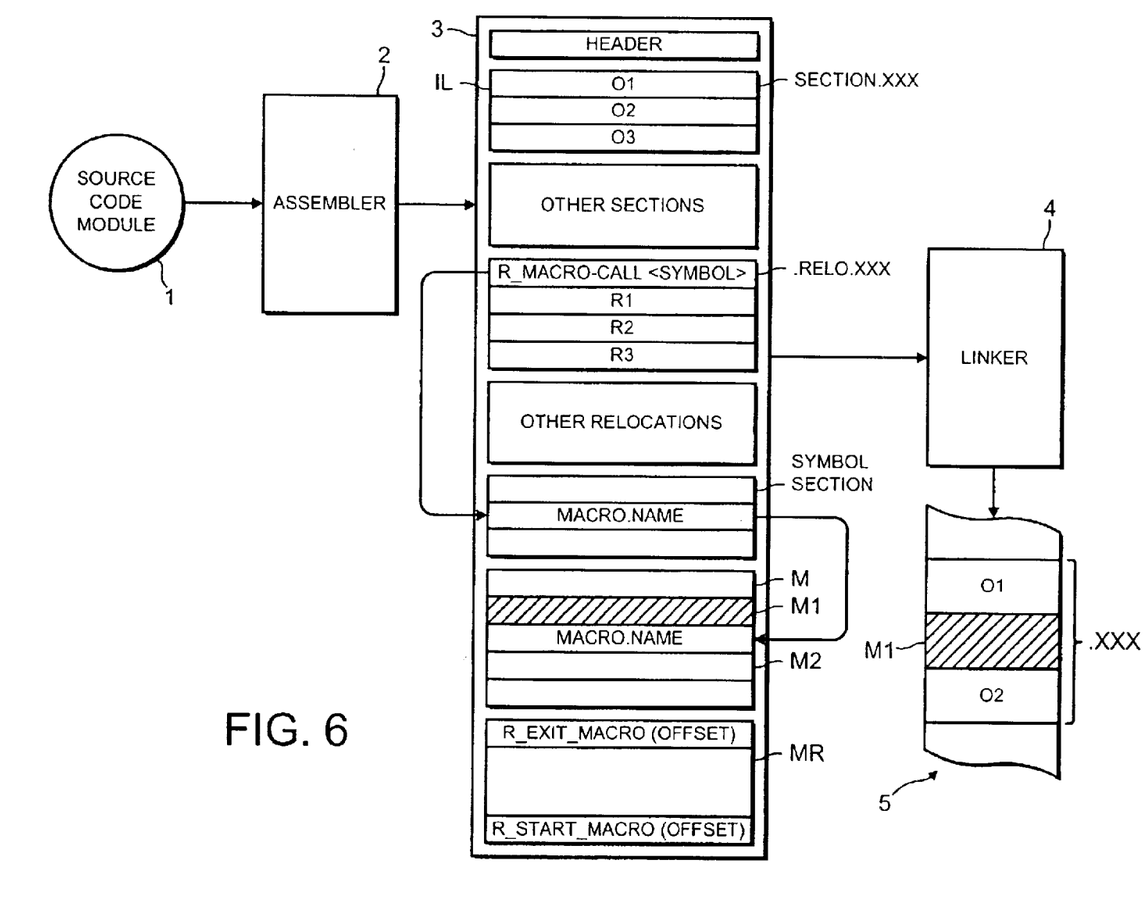
FIG. 6 is a diagram showing the use of macro sections.

Reference will now be made to FIGS. 3 and 6 to describe link time macros. Link time macros contain parameterizable code sequences M1,M2 etc that are presented to the linker just once, in a section of the object code module reserved for this purpose. This section has the name macro pre-defined for it. Code for the macro section is created by the assembler exactly as for other sections from user written source code. The macro section provides code sequences which may optionally be included in the final program. As mentioned earlier, the most useful optimizations may be stored in macro sections in object files in the standard library 6 delivered with the toolchain. The macro code extends the possibilities for optimization. Associated with each macro section macro is a relocation section (.relo.macro) MR which contains the relocations generated by the assembler for the macro section. A .relo.macro section can contain relocations that patch in parameters to its macro section. It also contains relocations which determine conditions to establish which macro code sequences are included in the final executable program. The object code module includes a symbol section holding symbols which allow values to be accessed by relocations.

As a matter of terminology we will call relocatable sections which are not the .macro section ordinary sections. One such section is labelled section.xxx in FIG. 6. It includes alternative code sequences labelled O1,O2 in FIG. 6, each with an associated relocation R1,R2,R3 in the relocation section .relo.xxx.

Link time macros are created by a programmer and included in the source code module. A link time macro is invoked by naming a symbol defined in the .macro section at the inserting location IL in the ordinary section .xxx where the optimizable sequence is required. The parameters are also specified. These are done by two relocations R_PUT_PARAM and R_MACRO_CALL discussed later which are generated by the assembler. Invocation of a macro section by the assembler is achieved by generating the macro call relocation R_MACRO_CALL<symbol>in the ordinary section relocations, e.g. before R1 in FIG. 6. In one embodiment, the assembler also plants a marker byte MB at the insertion location IL in the section data thus ensuring that the inserted code sequences have a distinct address.

The linker 4 implements a macro call relocation by opening the macro section M and its related .relo.macro section MR. The symbol identified in the macro call relocation accesses the symbol section which holds at that symbol an offset identifying a location in the macro section. The relocation module 12 first locates this offset in the object code module 3 and verifies that there is a link time macro starting at that offset with the correct macro name. In FIG. 6, M1 is specified. The relocation module 12 then traverses the relo.macro section starting at the R_START_MACRO until it encounters the end of macro relocation R_EXIT_MACRO. The macro section includes a number of alternative code sequences, each associated with conditional expressions embodied in the relocations in the MR section. The linker skips over any code sequences (and associated relocations) for which conditional linker expressions evaluate as false (as described earlier) Code sequences not skipped are to be inserted in the ordinary section replacing the marker byte(s) MB. Before being inserted these macro section bytes will be relocated themselves, taking into account their destination address in the ordinary section. If the same link time macro is invoked at multiple locations in the ordinary section then that part of the .macro section will be relocated multiple times with different values for the program counter at the start of the macro sequence depending on where it is being inserted in the ordinary section.

Linker optimization involves multiple passes over the relocations since the value of symbols change as code is inserted, and some symbols will be forward references. Those that are forward references will change, and so invalidate any uses of that symbol earlier in the same pass. For this reason it is necessary to continue making passes through the ordinary section applying relocations until the values of the symbols have stabilized.

The effect of this after linking is to provide in the final executable program 5 at the marked location IL in the ordinary section data .xxx a set of the macro code sequences (e.g. M1 in FIG. 6) drawn from the macro in the macro section between the offset identified in an R_START_MACRO relocation and that specified in the R_EXIT_MACRO relocation.

In order to support link time macros, a number of new Assembler Directives are required as follows. These cause macro sections and macro relocations to be invoked as described later.

In the macro section.
LT_IF FIXED
As LT_IF except that instead of passing a boolean expression expr, the condition is internal to the linker optimization process. The condition is normally false but becomes true when the linker requires a fixed length insert. The assembler issues an R_IF-FIXED relocation.
LT_DEFMACRO
macro_name(<param_type>param_name[, <paramtype>param_name])
[:maxbytes[:align[:sched_info]]]
This directive introduces a link time macro definition. The macro_name should be the label at the first instruction of the macro body. The param_names are the formal parameters used in the body of the macro. The assembler emits R_GET_PARAM for each occurrence of a formal parameter in an expression in the body of the macro. The param_type associated with the formal parameter is passed with the relocation R_GET_PARAM. The assembler emits R_START_MACRO at this point. The integers maxbytes and align (or zero if they are absent) are encoded in the subtype fields of the R_START_MACRO relocation. The sched_info field is used by the assembler for optimizing. This value is passed in the r_arg1 field and any value mismatch between the call and caller is reported by the linker unless sched_info is zero.
LT_ENDMACRO
Marks the end of the macro body. The assembler emits R_EXIT_MACRO at this point.
In ordinary sections.
LT_DECLMACRO
macro_name(<param_type>[,<param_type>]) [:sched_info]
The name of the macro and the types of the parameters that it expects are given in the directive. The link time macro name hides any mnemonic of the same name and is hidden by any assembler macro of the same name. The R_MACRO_CALL relocation is issued. The value sched_info is passed in the r_arg2 field of the macro call relocation (0 if not specified).

As an alternative to macro code being written in the object code module itself, it can be supplied in an object file within the toolchain library 6.

A link time (LT) macro invocation is signalled to the assembler by the syntax: macro_name[param[,param] . . . ] [:maxbytes[:align[:sched_info]]]

For each parameter the assembler emits a relocation R_PUT_PARAM for the parameter with index values 0,1, . . . etc. The assembler then emits the R_MACRO_CALL relocation with the symbol macro_name.

The meaning of the macro invocation is that a LT selected sequence of instructions is to be inserted by the linker at this point in the code. LT macro invocation is allowed only in ordinary sections.

The integers maxbytes, align, optionally passed in the macro call, enable error checking between the macro call and its instantiation. They are encoded into the subtype fields of the R_MACRO_CALL relocation. They are also used by the assembler to determine the maximum number of bytes that the macro call will generate, and the alignment (i.e. any guarantees about the low order bits of the macro length being zero). The integer sched_info must match any value given in the corresponding declaration. It is passed to the linker in the r_arg2 field. It contains architecture specific information about the kind of instructions contained in the macro (used by the assembler for scheduling). A value of zero for any of these means no information is provided, and link time checking is turned off.
Relocations for .macro Sections
R_IF_FIXED
This is like R_IF except that instead of popping a value from the stack, the condition is whether the linker is attempting to optimize. The linker will not be attempting to optimize if the code is marked as not optimizable, or if after several passes the macro is oscillating in size. For this purpose the linker maintains a condition flag.

R_START_MACRO

The linker seeks this relocation at the offset labelled by the macro name (relocations prior to this one are not processed) It is an error for this macro to appear more than once at one offset in a .macro section.

R_GET_PARAM index

This relocation conveys in its r.nonbit.subtype1 field s1 an index for accessing the parameter array 16. The linker reads the index'th parameter from its parameter array 16. The interpretation of this parameter depends on the RC_ARG1 bit in the r_class field (see Table 3). If this is set then the parameter is an index into the symbol table 17 and the symbol's value is pushed on to the linker's stack 24 of values. Otherwise the value itself is pushed. In all cases the nonbit.subtype2 field s2 is checked for type mis-match with the value stored in the parameter array at the index passed.

R_EXIT_MACRO

The linker stops inserting bytes/processing relocations from the .macro section. It discards the parameter array and then the macro invocation terminates.

Relocations for Ordinary Sections

R_PUT_PARAM index

An index is passed in the r.nonbit.subtype1 field s1. The value in the r_arg1 field is stored by the linker in the parameter array 16 at this index. The linker also stores the value of the r.nonbit.subtype2 field s2 of this relocation along with the parameter. This enables the linker to perform type checking when R_GET_PARAM is encountered.

R_MACRO_CALL symbol

The symbol specifies an offset in the macro section. The relocations in .relo.macro are traversed from the R_START_MACRO at that offset until R_EXIT_MACRO is processed. Section data from the macro section are inserted in the section at the location of the R_MACRO_CALL relocation. This relocation is only found inside relocation sections of ordinary sections. Generally multiple passes are required through the relocations for values to stabilize. The linker will store the current number of bytes patched by the R_MACRO_CALL relocation with that relocation. There may be circumstances where the optimization would not terminate because of a macro relocation oscillating in size indefinitely. If this happens the linker will start patching such macros with the condition "fixed size" true, so that the number of bytes patched-in stays constant from one pass to the next. The fixed size condition is checked for by the R_IF_FIXED relocation.

There follows an example of how to write a link time macro. The parts in the FIXED FONT are the actual sample assembler file for a link time macro. In between is commentary in normal font.

SECTION .macro

A link time macro is defined by the directive LT_DEFMACRO, for example a macro with a symbol parameter would be defined:

LT_DEFMACRO const_load(.SYM s)

The name of the macro must label the start of the sequence of instructions to be inserted and be exported, thus:

EXPORT const_load const_load:

Directives are written to instruct the linker to insert some of the subsequent instructions until the LT_ENDMACRO directive is reached. The alternatives are selected by expressions involving the parameters to the macro. For example:

T_IF (s =<0xFFFF)

MOVI s, Rφ

LT_IF_FIXED

NOP; to pad out the code to a fixed length when not optimizing    LT_ENDIF

LT_ENDIF

LT_IF (a>0xFFFF)

MOVI (s>>16), Rφ

SHORI (s&0xFFFF), Rφ

LT_ENDIF

LT_ENDMACRO

From an ordinary section the link time macro would be declared to the assembler and then invoked as follows:

SECTION .text, AX

LT_DECLMACRO const_load(.SYM); declaration of the macro and its parameter type. For a symbol the type is MPT_SYMBOL.

IMPORT fred; fred is unknown until link time

. . .

const_load fred; call link time macro to load value of symbol fred into register R0. The assembler emits a single marker byte into the section data.

It is instructive to write out this example with the assembler generated Elf side by side, see Tables 3 and 4.

TABLE 3

| Assembler source | Relocations generated in .relo.macro |
| --- | --- |
| SECTION .macro | .macro and .relo.macro sections are created |
| LT_DEFMACRO const_load (.SYM s) | R_START_MACRO |
| EXPORT const_load | const_load is put in the Elf symbol table as global |
| const_load: | |
| LT_IF (s =<0xFFFF) | R_PUSH 0xFFFF |
| | R_GET_PARAM index=0 type=MPT_SYMBOL |
| | R_LE |
| | R_IF |
| MOVI s, Rφ | (program counter advances) |
| | R_GET_PARAM index=0 type=MPT_SYMBOL |
| | R_b16s5B4 |
| LT_IF_FIXED | R_IF_FIXED |
| NOP | (program counter advances) |
| LT_ENDIF | R_ENDIF |
| LT_ENDIF | R_ENDIF |
| LT-IF (s > 0XFFFF) | R_PUSH 0XFFFF |
| | R_GET_PARAM index=0 type=MPT_SYMBOL |
| | R_GT |
| | R_IF |
| MOVI (s<<16), Rφ | (program counter advances) |
| | R_GET_PARAM index=0 type=MPT_SYMBOL |
| | R_PUSH 16 |
| | R_SHR |
| | R_b16s5B4 |
| SHORI (s&0xFFFF), Rφ | (program counter advances) |
| | R_GET_PARAM index=0 type=MPT_SYMBOL |
| | R_PUSH 0xFFFF |
| | R_AND |
| | R_b16s5B4 |
| LT_ENDIF | R_ENDIF |
| LT_ENDMACRO | R_EXIT_MACRO |

TABLE 4

| Assembler source | Relocations generated in .relo.text |
| --- | --- |
| SECTION .text,AX | .text and .relo.text sections are created |
| LT_DECLMACRO | The number and types of parameter |

TABLE 4-continued

| Assembler source | Relocations generated in .relo.text |
|---|---|
| const_load(.SYM) | are associated with the LT macro |
| IMPORT fred; | name const_load by the assembler |
| const_load fred | R_PUT_PARAM MPT_SYMBOL fred |
| | R_MACRO_CALL const_load |
| | The program counter is incremented |
| | by 1 (marker byte inserted in .text section). |

Annexe 1

```
typedef struct {
  Elf32_Addr r_offset;
  unsigned char r_class;
  union {
    struct {
      unsigned char bits;
      unsigned char bitstart;
      unsigned char bytes;
    } bit;
    struct {
      unsigned char reltype;
      unsigned char subtype1;
      unsigned char subtype2;
    } nonbit;
  } r;
  Elf32_Word r_arg1;
  ELF32_Word r_arg2;
} Elf32_Relo;
```

Annexe 2

| Relocation Type Name | | Meaning (C syntax is assumed) |
|---|---|---|
| | | reltyp |
| R_NONE | 1 | No action is performed. |
| R_NOOPTIMISE | 2 | Optimization will be turned off from r_offset |
| R_OPTIMISE | 3 | Optimization will be turned on from r_offset |
| R_PROC | 4 | Marks start of PROC. One marker byte is inserted at r_offset |
| R_ENDPROC | 5 | Marks end of PROC |
| R_MAX (signed) | 6 | tos=(arg1<arg2?arg1:arg2) |
| R_OR | 7 | tos=(arg1\|arg2) |
| R_XOR | 8 | tos=(arg1^arg2) |
| R_AND | 9 | tos=(arg1&arg2) |
| R_EQ | 10 | tos=(arg1==arg2) |
| R_NE | 11 | tos=(arg1!=arg2) |
| R_GT | 12 | tos=(arg1>agr2) |
| R_GE | 13 | tos=(arg1>=arg2) |
| R_LT | 14 | tos=(arg1<arg2) |
| R_LE | 15 | tos=(arg1<=arg2) |
| R_SHR | 16 | tos=(arg1>>arg2) note: arithmetic shift |
| R_SHL | 17 | tos=(arg1<<arg2) |
| R_ADD | 18 | tos=(arg1+arg2) |
| R_SUB | 19 | tos=(arg1-arg2) |
| R_MUL | 20 | tos=(arg1*arg2) |
| R_DIV | 21 | tos=(arg2/arg2) note: undefined if arg==0 |
| R_REM | 22 | tos=(arg1%arg2) note: undefined if arg2==0 |
| R_PC | 23 | Tos<-P |
| R_INV | 25 | tos=~tos |

Annexe 2 -continued

| Relocation Type Name | | Meaning (C syntax is assumed) |
|---|---|---|
| R_REL | 26 | tos<-0 |
| | | reltype |
| R_SIZE | 27 | tos<-Sz section size |
| R_PUSH | 28 | tos<- symbol attribute or value. s1 holds flag saying which symbol attribute/value to be pushed. |
| R_DUP | 29 | tos<-tos (duplicates the top of stack) |
| R_IF | 30 | if (!tos) section data is skipped |
| R_IF_FIXED | 31 | Worst case branch (only for .macro). |
| R_ELSE | 32 | see R_IF (not supported in .macro). |
| R_ENDIF | 33 | see R_IF |
| R_START_MACRO | 34 | Informational, for error checking. |
| | | reltyp |
| R_EXIT_MACRO | 35 | Linker stops inserting section data at r_offset |
| R_PUT_PARAM | 36 | s1 holds index, s2 holds type information; the linker associates r_arg with these |
| R_GET_PARAM | 37 | s1 holds index, s2 holds type information; the linker retrieves the value associated with these |
| R_STORE | 38 | s1 holds index; the linker associates the value r_arg with the index for retrieval via R_FETCH |
| R_FETCH | 39 | s1 holds index; the linker retrieves the value associated with the index |
| R_MACRO_CALL | 40 | r_arg 1 is a symbol in .macro section whence to insert section data. One marker byte is present at r_offset. |

Key

| | |
|---|---|
| s1, s2 | Mean the r.nonbit.subtype1, 2 field of the relocation. |
| S | Means the sum of r_arg1 and r_arg2 after interpreting them as symbol values or constant values according to RC_ARG1/2. |
| So | The value of symbol's st_other field. |
| O | Means the offset, relative to the base of the containing section, of the relocation entry symbol. |
| P | The absolute address of the relocation entry, r_offset (i.e. the PC). |
| Sz | Means the size of the relocation entry symbol's defining section. |
| tos | Top-of-stack, the value at the top of the internal linker stack. |
| tos <- | Pushes a 32-bit signed value onto the internal linker stack. |
| tos=arg1 op arg 2 | If both RC_ARG1 and RC_ARG2 are RC_UNUSED then both the arguments are assumed to be on the stack (with arg1 pushed first). Otherwise arg1 is S (i.e. the symbol value + addend) and arg2 is tos. The argument(s) on the stack are popped and the operation indicated as op is performed. Finally the result is pushed on the stack. |

What is claimed is:

1. A method of preparing an executable program from a plurality of object code modules, each module containing sets of section data and associated relocation instructions, and at least one of said modules further including a macro section containing code sequences at least some of which are likely to be repeatedly included in the executable program and macro relocations associated with said macro section, wherein at least one of said sets of section data includes at least one insertion location where at least some code sequences are to be inserted and wherein the associated relocation instructions include a macro call relocation (R_CALL_MACRO) identifying a location in the macro section, the method comprising at link time when said executable program is prepared:

reading said sets of section data and the associated relocation instructions;

on locating said macro call relocation identifying the location in the macro section; and inserting said at least some code sequences from said location in the macro section into the set of section data at the insertion location, said at least some code sequences being selected by reading the macro relocations.

2. A method according to claim 1, wherein said macro relocations calculate conditions resolvable at link time to determine which of said code sequences is to be included in the executable program.

3. A method according to claim 1, wherein said relocations include a relocation which supplies at least one parameter together with an index for holding said parameter in association with the index in a parameter array from which the parameter can be recalled at link time.

4. A method according to claim 3, wherein said relocations include a relocation which supplies an index for recalling said at least one parameter from the parameter array.

5. A linker for preparing an executable program for a plurality of object code modules, each module containing sets of section data and associated relocation instructions, at least one of said modules further including a macro section containing code sequences at least some of which are likely to be repeatedly included in the executable program and macro relocations associated with said macro section, wherein at least one of said sets of section data includes at least one insertion location where at least some code sequences are to be inserted, and wherein the associated relocation instructions include a macro call relocation identifying a location in the macro section, the linker comprising:

a relocation module for reading the relocation instructions, the relocation module being operable to identify a macro call relocation and to locate said location in the macro section;

a section data module for holding section data to which the relocation instructions relate and arranged to receive said at least some code sequences from the location in the macro section to be inserted at the insertion location; and a program preparing means which prepares said executable program including said set of section data with the inserted code sequences.

6. A linker according to claim 5, which comprises a parameter array for holding a set of parameters used by the macro relocation of the macro section each associated with a respective index.

7. A linker according to claim 5, which comprises a condition array which holds respective values with associated indexes, said indexes being conveyed by the relocation instructions for recalling said values, said values being used to conditionally select said at least some code sequences at link time.

8. A method of assembling an object code module for linking at link time to form an executable program, the method comprising:

executing a set of assembler directives including a macro call directive, and responsive to the macro call directive:

naming a location in a macro section in the object code module containing a plurality of code sequences, at least some of which are likely to be repeatedly included in the executable program;

marking at an insertion location IL in a set of section data in the object code module where at least some of said code sequences are to be inserted in the final executable program;

generating in association with the section data a macro call relocation identifying the named location in the macro section; and generating a set of macro relocations associated with said macro section for selecting said at least some code sequences for insertion at the insertion location.

9. A computer program product in the form of an object code module which contains sets of section data and associated relocation instructions, the module further including a macro section containing code sequences at least some of which are likely to be repeatedly included in the executable program and a set of macro relocations associated with said macro section wherein at least one of said sets of section data includes an insertion location where at least some code sequences are to be inserted, and wherein the associated relocation instructions include a macro call relocation identifying a location in the macro section, the computer program product being cooperable with a linker to cause execution of relocation operations by the linker in dependence on said relocations and including identifying the location in the macro section and inserting said at least some code sequences from that location in the macro section in the set of section data at the insertion location.

* * * * *